(12) United States Patent
MacGregor et al.

(10) Patent No.: US 8,265,913 B2
(45) Date of Patent: Sep. 11, 2012

(54) ELECTROMAGNETIC SURVEYING

(75) Inventors: Lucy MacGregor, Edinburgh (GB); David Andreis, Aberdeen (GB); Neville Barker, Ellon (GB)

(73) Assignee: Rock Solid Images PLC, London (GB)

( * ) Notice: Subject to any disclaimer, the term of this patent is extended or adjusted under 35 U.S.C. 154(b) by 1112 days.

(21) Appl. No.: 11/751,220

(22) Filed: May 21, 2007

(65) Prior Publication Data

US 2007/0280047 A1    Dec. 6, 2007

(30) Foreign Application Priority Data

May 22, 2006    (GB) .................................. 0610136.4

(51) Int. Cl.
*G06G 7/48*    (2006.01)
(52) U.S. Cl. .................. 703/10; 703/2; 702/11; 324/323
(58) Field of Classification Search .................. 703/2, 6, 703/10; 702/11; 324/323, 365, 366
See application file for complete search history.

(56) References Cited

U.S. PATENT DOCUMENTS

| 6,603,313 B1 * | 8/2003 | Srnka ........................... 324/354 |
| 2003/0146752 A1 | 8/2003 | Gianzero et al. |

FOREIGN PATENT DOCUMENTS

| GB | 2382875 A * | 6/2003 |
| GB | 2402745 A | 12/2004 |
| GB | 2410090 A | 7/2005 |
| GB | 2411006 A | 8/2005 |
| GB | 2413851 A | 11/2005 |
| GB | 2423370 A | 8/2006 |
| RU | 1805425 | 3/1993 |
| RU | 53460 | 5/2006 |

OTHER PUBLICATIONS

Unsworth, M., B.J. Travis and A.D. Chave, Electromagnetic induction by a finite dipole source over a 2-D Earth, Geophysics, 58, 198-214, 1003.*
Anderson, B, Bryant, Y, Luling, M, Spies, B, Helbig, K., 1994, Oilfield anisotropy: Its origins and electrical characteristics, Oilfield Review, 6, 48-56.
Constable S.C. & Weiss, C., 2006: Mapping thin resistors and hydrocarbons with marine EM methods: insights from 1D modelling, Geophysics, 71, 43-51.

(Continued)

*Primary Examiner* — Kamini S Shah
*Assistant Examiner* — Luke Osborne
(74) *Attorney, Agent, or Firm* — Locke Lord LLP

(57) ABSTRACT

A method of analysing results from a controlled source electromagnetic survey of a region of interest containing a previously identified geological structure suitable for bearing hydrocarbons is described. The method comprises providing a first survey data set obtained outside the region of interest, i.e. off-target, for a range of source-receiver orientations and offsets, and providing a second survey data set obtained inside the region of interest, i.e. on target, for a range of source-receiver offsets. The method further comprises performing a mathematical inversion of the first survey data set to provide a model of the subterranean strata outside the region of interest, and processing the second survey data set to provide a model of the subterranean strata inside the region of interest, wherein the processing of the second survey data set takes account of the results of the inversion of the first survey data set.

28 Claims, 9 Drawing Sheets

OTHER PUBLICATIONS

Constable, S. & Cox, C.S., 1996. Marine controlled source EM sounding 2: The Pegasus experiment, J. Geophys. Res., 101, 5519-5530.

Eidesmo, T., Ellingsrud, S., MacGregor, L.M., Constable, S., Sinha, M.C., Johansen, S., Kong, F-N & Westerdahl, H., 2002. Sea Bed Logging (SBL), a new method for remote and direct identification of hydrocarbon filled layers in deepwater areas, First Break, 20, 144-152.

Ellingsrud, S., Eidesmo, T., Johansen, S., Sinha, M.C., MacGregor, L.M. & Constable, S., 2002. Remote sensing of hydrocarbon layers using sea-bed logging (SBL): Results of a cruise offshore Angola, The Leading Edge, 21, 972-982.

Everett, M. & Constable, S.C., 1999. Electrical dipole fields over an anisotropic seafloor: theory and application to the structure of 40 Ma Pacific Ocean Lithosphere, Geophys. J. Int., 136, 41-56.

Klein, J.D., Martin, P.R. & Allen D.F., 1997. The petrophysics of electrically anisotropic reservoirs, The Log Analyst, 38, 25-36.

Srnka, L.J., Carazzone, J.J., Erikson, E.A. & Ephron, M.S., 2005. Remote reservoir resistivity mapping: an overview, SEG annual convention 2005, extended abstract, 3 Pages.

Tompkins, M., Alumbaugh, D., Stanley, D. & Lu, X., 2004. Numerical analysis of near borehole and anisotrophic layer effects on the response of 3-component induction logging tools, Geophysics, 69, 140-151.

Tompkins, M., 2005. The role of vertical anisotropy in interpreting marine CSEM data, SEG expanded abstract, presented at SEG annual meeting, Oct. 2005, 4 Pages.

Weiss, C. & Newman, G., 2002. Electromagnetic induction in a fully 3D anisotropic Earth, Geophysics, 67, 1104-1114.

Yu, L., Evans, R.L., & Edwards, N. Transient electromagnetic responses in seafloor with triaxial anisotropy, Geophys. J. Int., 129, 292-304, 1997.

Johansen, S.E., Amundsen, H. E. F., Rosten, T., Ellingsrud, S., Eidesmo. T., Bhuyian, A.H., Subsurface hydrocarbons detected by electromagnetic sounding, First Break, vol. 23, pp. 31-36, Mar. 2005.

Tompkins, M. J., Weaver, R., MacGregor L. M., Effects of Vertical Anisotropy on Marine Active Source Electromagnetic Data and Inversions, EAGE 66th Conference & Exhibition, Paris, Jun. 7-10, 2004, 4 Pages.

Behrens, J. P., The Detection of Electrical Anisotropy in 35 Ma Pacific Lithosphere: Results from a marine Controlled-Source Electromagnetic Survey and Implications for Hydration of the Upper Mantle, Dissertation for the degree of Doctor of Philosophy in Earth Sciences, University of California, San Diego, 2005, 195 Pages.

Constable S. C., Parker R. L., Constable, C. G., Occam's inversion: A practical algorithms for generating smooth models from EM sounding data, Geophysics, vol. 52, pp. 289-300, 1987.

MacGregor, L. M., Marine CSEM Sounding: Development of a regularised inversion for 2D resistivity structures, LITHOS Science Report, 1, 103-109, Apr. 1999.

Chave, A. D., Cox, C. S., Controlled electromagnetic sources for measuring electrical conductivity beneath the oceans 1. Forward problem and model study, J. Geophysical Research, vol. 87, No. B7, pp. 5327-5338, Jul. 1982.

Unsworth, J. M., Travis, B. J., Chave, A. D., Electromagnetic induction by a finite electric dipole source over a 2-D earth, Geophysics, vol. 58 No. 2, pp. 198-214, Feb. 1993.

Newman, G. A., Alumbaugh, D. L., Three-Dimensional Massively Parallel Electromagnetic Inversion -I. Theory, Report SAND96-0582, Sandia Nat'l Labs, 1996 and Geophys. J. Int., v. 128, pp. 345-354, 1997.

International Search Report for Corresponding International Patent Application No. PCT/GB2007/001497, 5 pages Dec. 6, 2008.

C. Modesto, Written Opinion for International Patent Application No. PCT/GB2007/001497, European Patent Office, dated Jun. 12, 2008, 11 Pages.

\* cited by examiner

ELECTROMAGNETIC SURVEYING

CROSS-REFERENCE TO RELATED APPLICATIONS

This application claims the benefit under 35 U.S.C. §119(a)-(d) of United Kingdom application GB0610136.4 filed on May 22, 2006.

FIELD OF THE INVENTION

The invention relates to electromagnetic (EM) surveying, and in particular to underwater EM surveying for hydrocarbon reserves, e.g., oil, gas, methane hydrates etc.

BACKGROUND

Seismic techniques are frequently used during hydrocarbon-exploration expeditions to identify the existence, location and extent of reservoirs in subterranean rock strata. However, whilst seismic surveying is able to identify such structures, the technique is often unable to distinguish between the different possible compositions of pore fluids within them. This is especially so for pore fluids which have similar mechanical properties, such as oil and seawater. It is therefore generally necessary to employ other survey techniques to determine whether a previously identified reservoir contains oil, or just aqueous pore fluids. One technique is exploratory well drilling in the region of potential interest. However, this is expensive and time consuming. An alternative technique recently developed is the controlled source electromagnetic surveying (CSEM) technique, such as described in GB 2 382 875 [2].

CSEM seeks to distinguish oil- and water-filled reservoirs on the basis of their differing electrical properties. This is done by transmitting an EM signal into seafloor, generally using a horizontal electric dipole (HED) source (transmitter), and measuring the response at EM receivers (detectors) for a range of distances from the source. Since hydrocarbons are more resistive than seawater, the presence of a hydrocarbon-bearing reservoir will, in general, lead to stronger EM fields than would be the case if the reservoir contained only seawater. This is because the highly conducting seawater attenuates the component of the EM signal passing through the reservoir more than would be the case if the reservoir contained hydrocarbon.

One proposed technique for CSEM surveying is to tow an EM source over a line of receivers and to directly compare response amplitudes for source-receiver offsets which are over a target with corresponding response amplitudes for source-receiver offsets which are not from over the target so that any enhancement in amplitude can be observed [1].

In practice, however, the interpretation of CSEM survey results is not so simple. In particular, it has been recognised that surveys must be carefully planned to reduce the likelihood of certain types of large-scale background structure giving rise to false-positive indications of hydrocarbon reservoirs. One way of doing this is to obtain survey data for a range of relative orientations between source and receiver, e.g., by towing a HED source over a deployed array of receivers. Data from receivers which are arranged inline with the HED source (i.e., on a line parallel to and passing through the axis of the HED axis) are more sensitive to the presence of thin resistive layers indicative of hydrocarbon-bearing reservoirs. Data from receivers which are arranged broadside to the HED source (i.e., on a line perpendicular to and passing through the HED axis), on the other hand, are more sensitive to characteristics of the large scale background. A comparison of data from both orientations can be used to reduce false-positive indications [2].

Analysing both inline and broadside data from a target region of interest has proven to be a reliable way of reducing the likelihood of ambiguous interpretation of CSEM data. However, there are still some classes of subterranean strata configuration which are not hydrocarbon bearing, but nonetheless produce characteristic CSEM responses which are similar to those associated with hydrocarbon reservoirs. For example, subterranean rock formations having significant degrees of vertically anisotropic conductivity (differing conductivity in the vertical and horizontal directions) can provide inline and broadside responses which are similar to those seen with hydrocarbon reservoirs. This means a vertically anisotropic rock formation can give rise to a false identification of hydrocarbon. Furthermore, in the event a vertically anisotropic rock formation does bear a hydrocarbon reservoir, the nature of the reservoir will be incorrectly determined. In particular, background anisotropy will lead to an underestimate of reservoir depth, and an over estimate of reservoir resistivity [3]. Thus a deep reservoir containing a relatively low fraction of hydrocarbon, and so of reduced economic interest, can be mistaken for what appears to be a commercially more interesting shallower reservoir with a higher hydrocarbon carbon (i.e., higher resistivity).

There are a number of subterranean strata configurations which can display significant degrees of vertical conductivity anisotropy. It is often displayed in sand and shale layers, and grain alignment of clay minerals in sedimentary layers can also lead to anisotropic conductivity, as can alignment of fractures in subterranean layers. Thus subterranean strata configurations such as these can lead to false positive indications of the presence of hydrocarbon, or an over estimate of the amount, and ease of recovery, of any hydrocarbon that is present. There is therefore a need for techniques which further reduce the likelihood of ambiguous interpretation of CSEM data to help avoid expensive drilling and further survey programs of regions which have been wrongly indicated as containing commercially useful quantities of hydrocarbon.

SUMMARY

According to a first aspect of the invention there is provided a method of analysing results from a controlled source electromagnetic survey of a region of interest, the region of interest containing a previously identified geological structure suitable for bearing hydrocarbons, the method comprising: providing a first survey data set obtained outside the region of interest for a range of source-receiver orientations and offsets; providing a second survey data set obtained inside the region of interest for a range of source-receiver offsets; performing a mathematical inversion of the first survey data set to provide a model of the subterranean strata outside the region of interest; and processing the second survey data set to provide a model of the subterranean strata inside the region of interest, wherein the processing takes account of the model of the subterranean strata outside the region of interest.

The first data set may be referred to as an off-target data set and the second data set may be referred to as an on-target data set. Because the off-target data set are obtained away from the geological structure which may potentially be a hydrocarbon reservoir and for a range of source-receiver offsets, the inversion of these data are able to recover features of the subterranean strata (such as conductivity anisotropy) which cannot normally be distinguished from the presence of hydrocarbons and so are a source of ambiguity. Accordingly, by taking account of these characteristics in the inversion of the on-target data, the likelihood of ambiguity is much reduced.

The off-target survey data set may be obtained using a horizontal electric dipole (HED) source or a vertical electric dipole (VED). For an HED source, the off-target data set may comprise data for a range of offsets broadside to the axis of the source and data for a range of offsets inline with the axis of the source. The off-target survey data set may further comprise data for a range of offsets for orientations intermediate between broadside to the axis of the source and inline with the axis of the source. By providing data from a comprehensive range of orientations, characteristics of the background strata (i.e. the strata excluding the potential hydrocarbon reservoir) that can affect CSEM data in a manner similar to the presence of hydrocarbon can be better constrained by the off-target data.

The off-target survey data for offsets inline with the axis of the source may be horizontal or vertical field data, and furthermore may be electric or magnetic field data.

The on-target data may be obtained in a broadly similar way, again using an HED or a VED source. However, it is noted that unlike conventional CSEM surveying with an HED source. data in the region of interest need only be obtained for inline orientations without leading to increased ambiguity. This is because the background rock formation in which the geological structure of interest is cited is already well characterised by the inversion of the off-target data. Accordingly, inline data (which are the data most sensitive to the presence of hydrocarbon) from the region of interest are sufficient to allow the contents of any potential hydrocarbon reservoir (i.e. whether oil or water) to be determined. However, the on-target data set may further comprise data for a range of offsets broadside to the dipole axis of the source.

In general, it is sufficient that data are collected with sufficient source and receiver information that both the target and the background can be mapped.

The survey data in the second survey data set for offsets inline with the axis of the source may also be horizontal or vertical field data, and may be electric or magnetic field data.

The step of performing a mathematical inversion of the on-target survey data set may be configured to allow conductivity in the model of the subterranean strata outside the region of interest to be independently determined in two directions. This may be beneficial because effects of anisotropic conductivity in the background strata can be a significant cause for interpretation ambiguity. In particular, the two directions may be a vertical direction and a horizontal direction so that vertical conductivity anisotropy can be characterised.

The step of processing the on-target survey data set may comprise performing a mathematical inversion in which at least one parameter of model space is constrained according to its value in the model of the subterranean strata outside the region of interest.

For example, the parameter may be constrained by being ascribed a fixed value corresponding to its value in the model of the subterranean strata outside the region of interest, may be constrained by being required to adopt a value within a range of values based on its value in the model of the subterranean strata outside the region of interest, or may be constrained by being ascribed a preferred value based on its value in the model of the subterranean strata outside the region of interest, with the mathematical inversion of the on-target survey data set then being prejudiced in favour of models in which the parameter is closest to the preferred value.

Alternatively, other processing techniques may be employed which take account of the off-target model. For example, the step of processing the on-target survey data set may comprise performing a wave-field extrapolation in which an initial model for the wave-field extrapolation corresponds to the model of the subterranean strata outside the region of interest.

Furthermore, the on-target survey data set may be iteratively processed whereby subsequent iterations take account of the model of the subterranean strata inside the region of interest obtained from one or more previous iterations.

According to a second aspect of the invention there is provided a computer program product bearing machine readable instructions for implementing a method of analysing results from a controlled source electromagnetic survey according to the first aspect of the invention.

According to a third aspect of the invention there is provided computer apparatus loaded with machine readable instructions for implementing the method of analysing results from a controlled source electromagnetic survey according to the first aspect of the invention.

According to a fourth aspect of the invention there is provided a method of planning a controlled source electromagnetic survey of a region of interest, the region of interest containing a previously identified geological structure suitable for bearing hydrocarbons, the method comprising: creating a model of a region outside the region of interest, including a rock formation and a body of water above it; creating a model of the region of interest which corresponds to the model outside the region of interest, but further including a hydrocarbon reservoir; performing a simulation of an electromagnetic survey outside the region of interest to provide a first simulated survey data set for a range of source-receiver orientations and offsets; performing a simulation of an electromagnetic survey inside the region of interest to provide a second simulated survey data set for a range of source-receiver offsets; performing a mathematical inversion of the first simulated data set to provide a simulated recovered model of the subterranean strata outside the region of interest; and processing the second simulated data set to provide a simulated recovered model of the subterranean strata inside the region of interest taking account of the simulated recovered model of the subterranean strata outside the region of interest.

The planning may further include repeating the simulation of an electromagnetic survey outside the region of interest for a number of source frequencies in order to select optimum survey conditions in terms of source frequency and source-receiver orientations and distances for characterising the rock formation.

Furthermore, the method may further comprise repeating the simulation of an electromagnetic survey inside the region of interest for a number of source frequencies in order to select optimum survey conditions in terms of source frequency and source-receiver distances for probing the hydrocarbon reservoir.

By planning a survey in a way which takes account of the manner in which the data are to be analysed, and by considering the effects of different choices of frequency and source-receiver orientations and offsets, the resulting data from the real survey will be well suited for analysis and will be most sensitive to the characteristics of the subterranean strata of most interest.

According to a fifth aspect of the invention there is provided a computer program product bearing machine readable instructions for implementing a method of planning a controlled source electromagnetic survey according to the fourth aspect of the invention.

According to a sixth aspect of the invention there is provided a computer apparatus loaded with machine readable instructions for implementing the method of planning a controlled source electromagnetic survey according to the fourth aspect of the invention.

According to a seventh aspect of the invention there is provided a method of performing a controlled source electromagnetic survey of a region of interest, the region of interest containing a previously identified geological structure suitable for bearing hydrocarbons, the method comprising: obtaining a first survey data set outside the region of interest for a range of source-receiver orientations and offsets; performing a mathematical inversion of the first survey data set to provide a model of the subterranean strata outside the region of interest; creating a model of the region of interest by adding a model hydrocarbon reservoir to the model of the subterranean strata outside the region of interest; performing a simulation of an electromagnetic survey of the model of the region of interest to provide a simulated survey data set for a range of source-receiver offsets; repeating the simulation of an electromagnetic survey of the model of the region of interest for a number of source frequencies in order to select optimum survey conditions in terms of source frequency and source-receiver distances for probing the hydrocarbon reservoir; and obtaining a second survey data set inside the region of interest in accordance with the selected optimum survey conditions.

This approach allows the results of an analysis of the off-target data to be used in planning the on-target survey. Because the on-target survey can be planned using the results of the off-target survey to define the large scale background structure, the survey conditions for the on-target survey can be best optimised.

By optimum, it is not necessarily meant that the best survey conditions are found, but only that a set of survey conditions is found which will provide strong, unmistakable indications in the case that there is a hydrocarbon reservoir at the survey site. The iterative procedure may be purely under manual control. However, preferably, the simulator can allow the user the option of automatically optimising the survey conditions. The user can then switch between manual and automated iteration as desired.

The method of performing a controlled source electromagnetic survey according to the seventh aspect of the invention may be such that the second survey data set is detected at a first time, and the method may further comprise obtaining at least one further survey data set inside the region of interest at a time which is different from the first time to allow changes in the region of interest to be monitored. This allows, for example, temporal monitoring of a reservoir from which hydrocarbon is being drawn.

According to an eighth aspect of the invention there is provided a method for obtaining hydrocarbon from a region of interest containing a previously identified geological structure suitable for bearing hydrocarbons, the method comprising: obtaining a first survey data set outside the region of interest for a range of source-receiver orientations and offsets; performing a mathematical inversion of the first survey data set to provide a model of the subterranean strata outside the region of interest; creating a model of the region of interest by adding a model hydrocarbon reservoir to the model of the subterranean strata outside the region of interest; performing a simulation of an electromagnetic survey of the model of the region of interest to provide a simulated survey data set for a range of source-receiver offsets; repeating the simulation of an electromagnetic survey of the model of the region of interest for a number of source frequencies in order to select optimum survey conditions in terms of source frequency and source-receiver distances for probing the hydrocarbon reservoir; obtaining a second survey data set inside the region of interest in accordance with the selected optimum survey conditions; identifying a hydrocarbon reservoir from the second survey data set; and penetrating the identified hydrocarbon reservoir with a hydrocarbon-producing well.

According to a ninth aspect of the invention there is provided a volume of hydrocarbon obtained from a region of interest containing a previously identified geological structure suitable for bearing hydrocarbons, the hydrocarbon obtained by: obtaining a first survey data set outside the region of interest for a range of source-receiver orientations and offsets; performing a mathematical inversion of the first survey data set to provide a model of the subterranean strata outside the region of interest; creating a model of the region of interest by adding a model hydrocarbon reservoir to the model of the subterranean strata outside the region of interest; performing a simulation of an electromagnetic survey of the model of the region of interest to provide a simulated survey data set for a range of source-receiver offsets; repeating the simulation of an electromagnetic survey of the model of the region of interest for a number of source frequencies in order to select optimum survey conditions in terms of source frequency and source-receiver distances for probing the hydrocarbon reservoir; obtaining a second survey data set inside the region of interest in accordance with the selected optimum survey conditions; identifying a hydrocarbon reservoir from the second survey data set; penetrating the identified hydrocarbon reservoir with a hydrocarbon-producing well; and extracting the hydrocarbon from the hydrocarbon reservoir using the well.

According to a tenth aspect of the invention there is provided a results data set representing a region of interest containing a previously identified geological structure suitable for bearing hydrocarbons, the results data set obtained by: obtaining a first survey data set outside the region of interest for a range of source-receiver orientations and offsets; performing a mathematical inversion of the first survey data set to provide a model of the subterranean strata outside the region of interest; creating a model of the region of interest by adding a model hydrocarbon reservoir to the model of the subterranean strata outside the region of interest; performing a simulation of an electromagnetic survey of the model of the region of interest to provide a simulated survey data set for a range of source-receiver offsets; repeating the simulation of an electromagnetic survey of the model of the region of interest for a number of source frequencies in order to select optimum survey conditions in terms of source frequency and source-receiver distances for probing the hydrocarbon reservoir; obtaining a second survey data set inside the region of interest in accordance with the selected optimum survey conditions; and generating the results data set based on the second survey data set.

According to an eleventh aspect of the invention there is provided a computer readable storage medium having a data set according to the tenth aspect of the invention recorded thereon.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
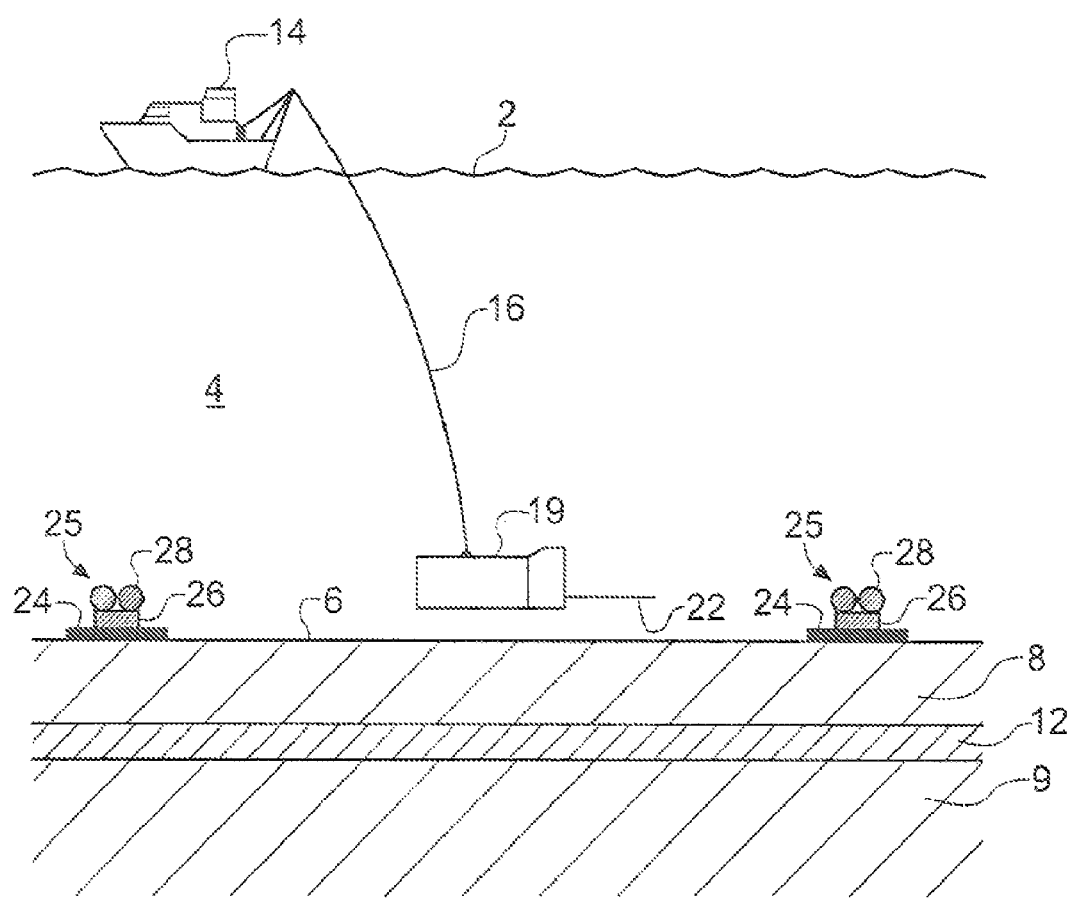
FIG. 1 schematically shows a surface vessel 14 undertaking controlled source electromagnetic (CSEM) surveying of a subterranean strata configuration using standard apparatus.

FIG. 1 schematically shows a surface vessel 14 undertaking controlled source electromagnetic (CSEM) surveying of a subterranean strata configuration using standard apparatus [2] to obtain data sets suitable for analysis according to an embodiment of the invention. The subterranean strata in this example includes an overburden layer 8, an underburden layer 9 and a hydrocarbon reservoir 12. The surface vessel 14 floats on the surface 2 of a body of water, in this case seawater 4. A submersible vehicle 19 carrying a source (transmitter) 22 in the form of a horizontal electric dipole (HED) is attached to the surface vessel 14 by an umbilical cable 16. The umbilical cable provides an electrical, mechanical and optical connection between the submersible vehicle 19 and the surface vessel 14. The HED source is supplied with a drive current so that it broadcasts an HED electromagnetic (EM) signal into the seawater 4.

One or more remote receivers (detectors) 25 are located on the seafloor 6. Each of the receivers 25 include an instrument package 26, a detector antenna 24, a floatation device 28 and a ballast weight (not shown). Each detector antenna 24 comprises three orthogonal electric dipole antennae. In other examples, more components of EM fields at the receiver may be measured, e.g. magnetic field components. The electric dipole detector antennae are sensitive to components of the electric fields induced by the HED source in the vicinity of the receiver 25, and produce electric field detector signals therefrom. During a survey, the instrument package 26 records the detector signals while the transmitter 22 is towed relative to the receivers 25. Thus detector signals for a range of relative source and receiver positions are obtained to provide a survey data set of the region being surveyed.

The inventors have extensively modelled how CSEM data is affected by anisotropic conductivity (inverse resistivity) in subterranean strata for different source-receiver orientations.

Figure 2:
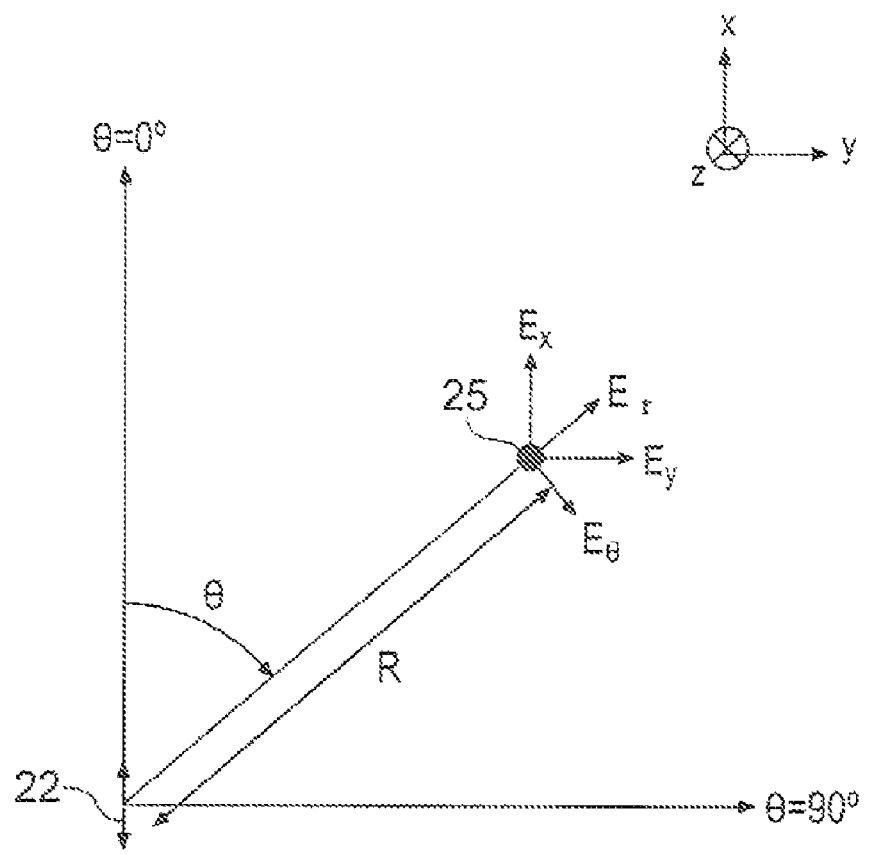
FIG. 2 is a schematic plan view showing a co-ordinate system for describing the relative placement of an HED source and a receivers during a CSEM survey.

FIG. 2 is a schematic plan view showing a co-ordinate system for describing the relative placement of the HED source 22 and each of the receivers 25 during surveying. The position of the receivers 25 with respect to the HED source 22 is most suitably described in cylindrical polar co-ordinates with the centre of the HED source 22 at the origin. The position of a receiver 25 is defined by an azimuthal angle $\theta$ and a separation distance (or range) R. The angle $\theta$ is measured clockwise from a line passing through, and running parallel to, the HED source axis, as indicated in FIG. 2 by the line marked $\theta=0°$. A receiver placed along this line, i.e. such that is has an azimuthal angle $\theta$ of 0°, is referred to as being in a direct inline or end-on position. A receiver with an azimuthal angle $\theta$ of 90°, such that it lies on the line marked $\theta=90°$ in FIG. 2, is referred to as being in a direct broadside position. The axial co-ordinate z extends vertically downwards into the seafloor. Thus the electric field at a receiver may be considered to be resolved into a radial component $E_r$, and an orthogonal azimuthal component $E_\theta$ in the horizontal plane, and a vertical component $E_z$.

The direction of the x-, y- and z-axes of a Cartesian co-ordinate system which may also be used for describing the geometry of the source and receivers is schematically shown at the top-right of FIG. 2. The x-axis runs parallel to the source dipole axis (i.e. parallel to azimuth angle $\theta=0$). The y-axis runs perpendicular to the source dipole axis (i.e. parallel to azimuth angle $\theta=90$). The z-axis runs vertically downwards into the seafloor. Thus the electric field at a receiver may also be considered to be resolved into an x-component $E_x$ and an orthogonal y-component $E_y$ in the horizontal plane, and a vertical component $E_z$. Although the Cartesian co-ordinate system is shown displaced from the source 22 in FIG. 2 for clarity, in general the origin of the Cartesian co-ordinate system will be considered to be at the centre of the source.

Figure 3A:
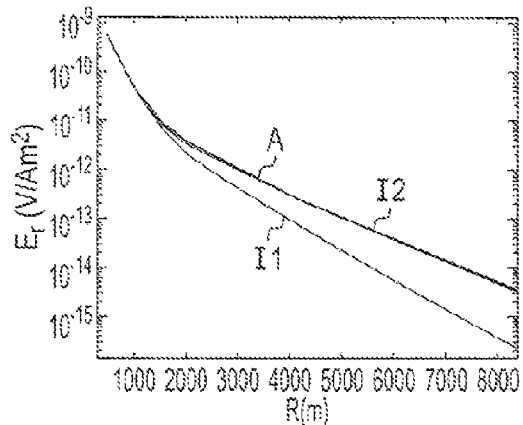
FIGS. 3A, 4A and 5A are graphs respectively showing the modelled inline-radial, broadside-azimuthal and inline-vertical electric field component amplitudes for three different subterranean model strata configurations as a function of offset.

FIG. 3A is a graph schematically showing the modelled radial electric field component amplitude $E_r$ seen at a receiver in an inline orientation (i.e. $\theta=0$) in response to an HED source broadcast signal as a function of separation R between the source and the receiver. The HED source is driven by an AC drive signal at a frequency of 0.3 Hz and the electric field is calculated per unit transmitter electric dipole moment. Curves are shown for three different model subterranean strata configurations. The curve marked I1 corresponds to a model subterranean strata configuration comprising a uniform half-space beneath the seafloor with an isotropic resistivity of 1 $\Omega$m. The curve marked I2 corresponds to a model subterranean strata configuration comprising a uniform half-space beneath the seafloor with an isotropic resistivity of 2 $\Omega$m. The curve marked A corresponds to a model subterranean strata configuration comprising a uniform half-space beneath the seafloor having an anisotropic resistivity of 2 $\Omega$m in the vertical direction and 1 $\Omega$m in all directions in the horizontal plane. For each model the seawater is represented by a uniform isotropic half-space having resistivity 0.3 $\Omega$m.

Figure 3B:
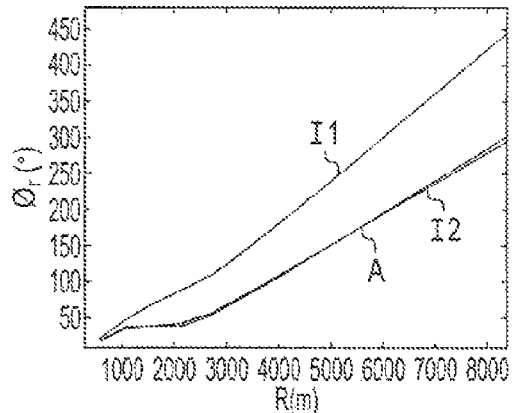
FIGS. 3B, 4B and 5B are graphs respectively showing the modelled phase of the inline-radial, broadside-azimuthal and inline-vertical electric field components plotted in FIGS. 3A, 4A and 5A.

FIG. 3B is a graph schematically showing the phase $\phi$ relative to the HED source AC drive signal for the modelled radial electric field components $E_r$ plotted in FIG. 3A. This is again shown for the three different model subterranean strata configurations 11, 12 and A.

Figure 4A:
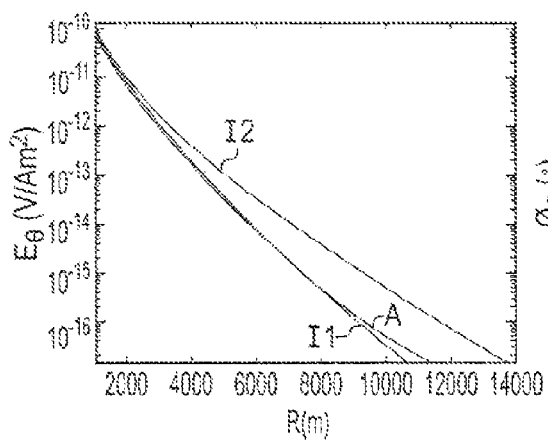
Figure 4B:
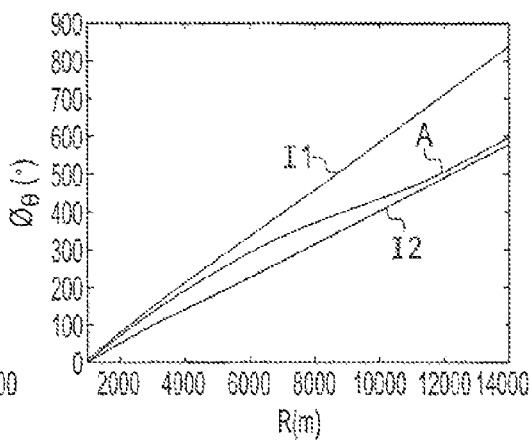

FIGS. 4A and 4B are similar to, and will be understood from, FIGS. 3A and 3B, but show modelled curves for the azimuthal electric field component amplitude $E_\theta$ seen at a receiver in a broadside orientation (i.e. $\theta=90$) for a range of offsets R.

Figure 5A:
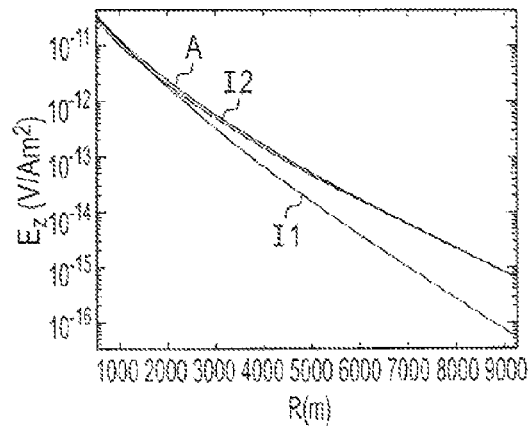
Figure 5B:
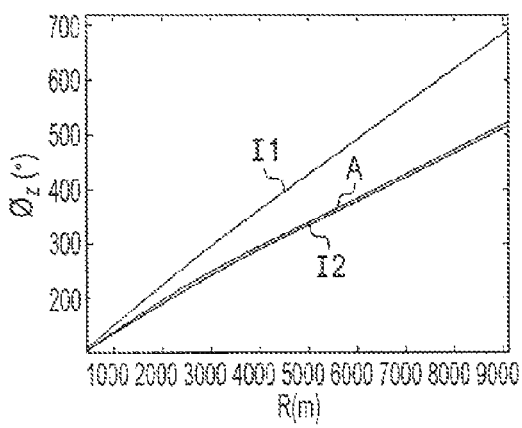

FIGS. 5A and 5B are also similar to, and will be understood from, FIGS. 3A and 3B, but show modelled curves for the vertical electric field component amplitude $E_z$ seen at a receiver in an inline orientation (i.e. $\theta=0$) for a range of offsets R.

It is apparent from FIGS. 3 to 5 that the effect of anisotropic conductivity (conductivity is simply the inverse of resistivity) varies with the relative orientation between the source and the receiver.

FIGS. 3A, 3B, 5A and 5B show that for inline orientations, the amplitude and phase of the measured electric fields (both the radial and the vertical components—there is no azimuthal component in the inline orientation because the earth models are azimuthally symmetric) are most sensitive to the resistivity of the subterranean strata in the vertical direction. This is apparent because the curves for the anisotropic model subterranean strata configuration (curves marked A) closely match the curves for the 2 $\Omega$m isotropic half-space (marked 12), and 2 $\Omega$m is the resistivity of the anisotropic model in the vertical direction.

FIGS. 4A and 4B, on the other hand, show that for broadside orientations, the measured electric fields are most sensitive to the horizontal resistivity. That is to say the curves for the anisotropic model subterranean strata configuration most closely match the curves for the uniform isotropic half-space having resistivity 1 $\Omega$m.

Figure 6A:
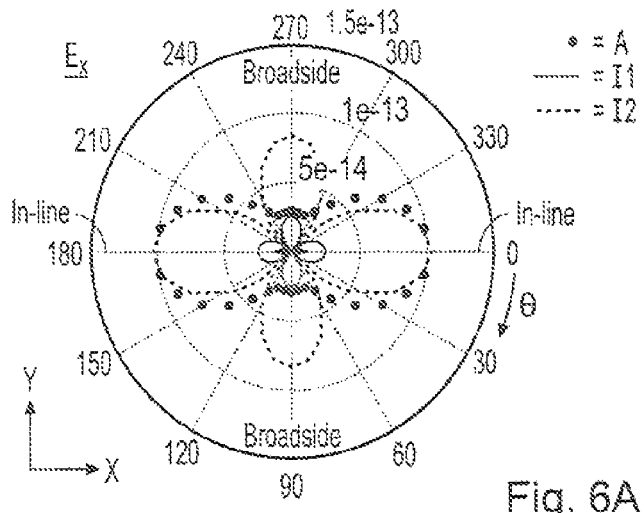
FIGS. 6A, 6B and 6C are polar diagrams respectively showing the modelled electric field component amplitudes parallel to the source dipole axis, perpendicular to the source dipole axis, and in a vertical direction for a CSEM survey at an offset 5 km as a function of receiver azimuth $\theta$.

FIG. 6A is a polar diagram showing the modelled electric field component amplitude $E_x$ along the x-axis (i.e. the component parallel to the source dipole axis) at a receiver offset R of 5 km as a function of receiver azimuth $\theta$. Data are shown for the same three model subterranean strata configurations I1, I2, A as described above in connection with FIGS. 3 to 5, as indicated by the legend at the left-hand side of the figure.

Figure 6B:
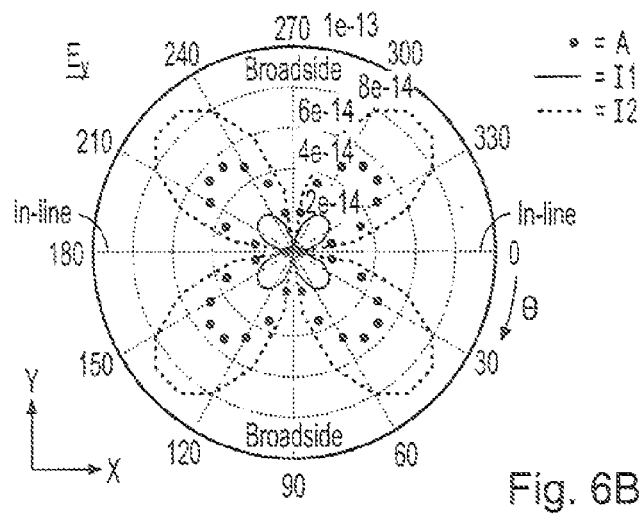
Figure 6C:
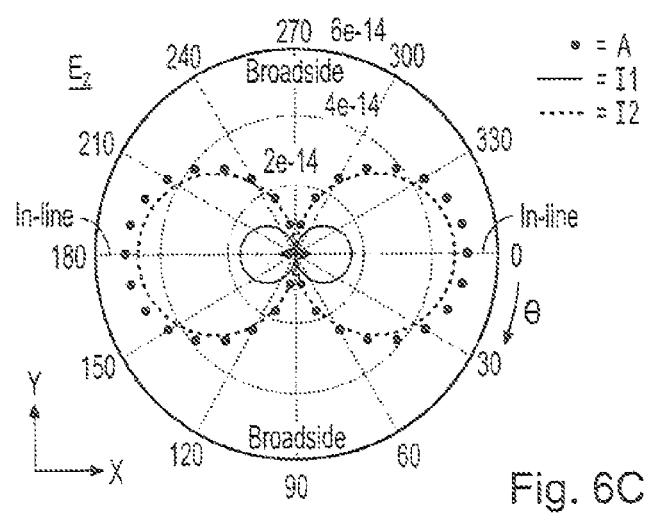

FIGS. 6B and 6C are similar to, and will be understood from, FIG. 6A, but respectively show the modelled electric field component amplitude $E_y$ along the y-axis (perpendicular to the dipole) and the modelled electric field component amplitude $E_z$ along the z-axis (i.e. the vertical component).

FIG. 6A confirms that for inline orientations (for which $E_x$ and $E_r$ are identical), the response of the anisotropic model is dominated by its vertical resistivity of 2 $\Omega$m. This is apparent because the response of the anisotropic model (indicated by dots in the figure) matches the response of the isotropic half-space having resistivity 2 $\Omega$m (dashed line). FIG. 6A also confirms that for broadside orientations (for which $E_x$ and $E_\theta$ are identical), the response of the anisotropic model is dominated by its horizontal resistivity (1 $\Omega$m). This is apparent because the response of the anisotropic model matches the response of the isotropic half-space having resistivity 1 $\Omega$m in these orientations.

From FIG. 6A it can be seen that the vertical resistivity in the anisotropic model dominates the response for azimuths within around +/-30 degrees of directly inline (i.e. for azimuths $\theta<30$, $150<\theta<210$, and $\theta>330$). Accordingly, references to inline orientations should be considered to mean azimuths falling within these ranges, unless the context suggests otherwise. Similarly, it can be seen that the horizontal resistivity in the anisotropic model dominates the response for azimuths within around +/-30 degrees of directly broadside (i.e. for azimuths $60<\theta<120$ and $240<\theta<300$). Accordingly, references to broadside orientations should be considered to mean azimuths falling within these ranges, unless the context suggests otherwise. At intermediate azimuths (i.e. around $30<\theta<60$, $120<\theta<150$, $210<\theta<240$ and $300<\theta<330$), the response of the anisotropic model falls between the two isotropic half-space responses.

FIG. 6C shows that the response of the anisotropic model for the vertical electric field component $E_z$ is dominated by the vertical resistivity of the model (2 $\Omega$m) for all orientations for which a significant signal is detectable. This is again apparent because the response of the anisotropic model (dots) matches the response of the isotropic half-space with resistivity 2 $\Omega$m (dashed line).

FIG. 6B shows that the response of the anisotropic model for the electric field component $E_y$ along the y axis (i.e. perpendicular to the dipole axis) falls between the two isotropic half-space responses. It is noted that this component is not significant for direct inline and direct broadside orientations. This is because $E_y$ is identical to $E_\theta$ for directly inline orientations and is identical to $E_r$ for directly broadside orientations.

When interpreting CSEM data sets, the response may be expressed in terms of the magnitude of the semi-major axis of a polarisation ellipse defined by two orthogonal horizontal components of the detected EM field at a given location [2]. The directions of the two orthogonal horizontal components may be chosen arbitrarily without affecting the magnitude of the semi-major axis of the polarisation ellipse. Accordingly, analysis can be based on data resolved along the x- and y-directions ($E_x$ and $E_y$), data resolved along the radial and azimuthal directions ($E_r$ and $E_\theta$), or more likely, data along two directions which are not necessarily known, but simply correspond to the orientations of the orthogonal horizontal detector antennae on the seafloor. Accordingly the magnitude of the polarisation ellipse provides a robust measure of seafloor EM fields which is less affected by navigational uncertainties than the magnitude of the individual components. The orientation of the semi-major axis of the polarisation ellipse has also been shown to provide constraints on seafloor structure in the context of horizontal conductivity anisotropy within the lower crust and upper mantle [4].

Figure 7A:
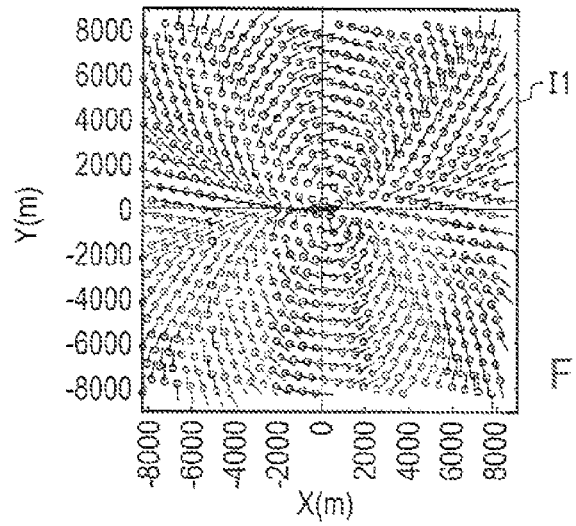
FIGS. 7A, 7B and 7C schematically show the modelled orientation of the semi-major axis of a polarisation ellipse for the horizontal electric field components seen by receivers for a range of offsets and orientations relative to the source in a CSEM survey for three different model subterranean strata configurations.
Figure 7B:
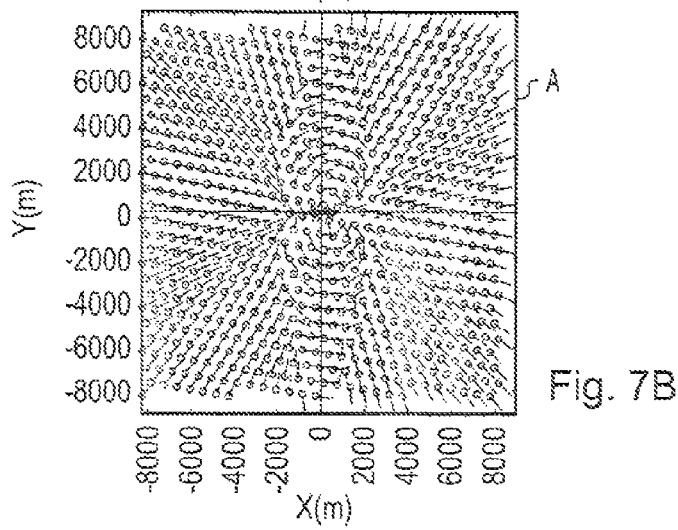
Figure 7C:
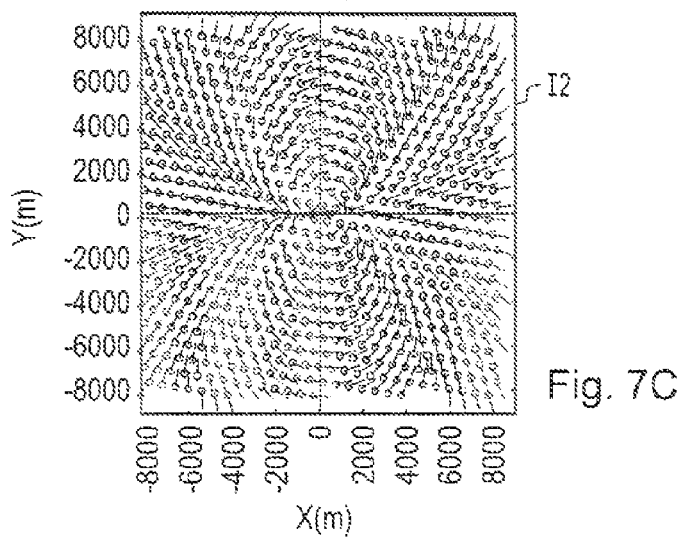

FIGS. 7A, 7B and 7C schematically show the modelled orientation of the semi-major axis of a polarisation ellipse for the horizontal electric field components seen by receivers for a range of offsets and orientations relative to the source. Results are shown for the three model subterranean strata configurations previously described above. FIG. 7A (I1) shows the modelled response for the uniform isotropic half-space with resistivity 1 $\Omega$m, FIG. 7B (A) shows the response for the uniform anisotropic half-space having vertical resistivity 2 $\Omega$m and horizontal resistivity 1 $\Omega$m, and FIG. 7C (I2) shows the modelled response for the uniform isotropic half-space with resistivity 2 $\Omega$m. The circles in the figures represent the positions of the modelled receivers. The lines associated with each of the circles show the orientations of the polarisation ellipses. In each case the HED source is at the centre of each Figure (i.e. x=y=0) and is driven by an AC drive signal at a frequency of 0.3 Hz.

It can be seen from FIGS. 7A and 7C that the distribution of orientations of the polarisation ellipses for the two isotropic half-spaces are almost identical. Thus the orientations of the polarisation ellipses are not sensitive to the overall resistivity of a uniform isotropic half-space. However for the anisotropic model (FIG. 7B), the orientation of the polarisation ellipse shows a skew compared to the isotropic models, particularly for source-receiver orientations intermediate between direct in-line and direct broadside.

Thus, as demonstrated above, the degree of vertical conductivity anisotropy in subterranean strata affects CSEM response data differently for different orientations, and furthermore data from a range of source-receiver orientations are required if the degree of vertical conductivity anisotropy is to be well determined.

Characteristics of the subterranean strata that are not directly related to the presence of hydrocarbon, but which have different effects on inline and broadside CSEM survey data, such as anisotropic conductivity, are possible sources of ambiguity. This is because conventional geometric based surveying relies on differences in inline and broadside responses being due to the presence (or not) of hydrocarbons [2]. It is therefore important that characteristics such as the degree of conductivity anisotropy in the background strata are taken into account when interpreting CSEM data. However, because conductivity anisotropy gives rise to effects which are similar to those associated with the presence of hydrocarbons, it can be difficult to isolate the effects of one from the other.

In realising this, the inventors have further recognised that in order to reduce the likelihood of ambiguous interpretation of CSEM data, two survey data sets should be provided for analysis. One survey data set, referred to here as the on-target data set, is obtained by surveying a region of interest which contains a previously identified geological structure suitable for bearing hydrocarbons (i.e. a potential hydrocarbon reservoir). The potential hydrocarbon reservoir may have been identified using any conventional technique, for example, seismic surveying. The other survey data set, referred to here as the off-target data set, is obtained by surveying away from (i.e. outside of) the region containing the potential hydrocarbon reservoir. Furthermore, because the degree of anisotropic conductivity cannot be determined from inline data alone, it is important that the off-target data set comprises data obtained for a range of offsets and orientations.

Preferably the off-target data are obtained from a region which is immediately adjacent the region containing the potential hydrocarbon reservoir (i.e. the region of interest). This helps to ensure the large scale background structure in the region of interest (i.e. the subterranean strata excluding the potential hydrocarbon reservoir) are as similar as possible as the subterranean strata in the region from which the off-target data are collected.

For example, if the identified geological structure has a characteristic horizontal extent of 20 km, the on-target data set may be obtained by surveying over a 20 km by 20 km area of seafloor centred on the potential hydrocarbon reservoir, and the off-target data set may be obtained by surveying over a 20 km by 20 km area of seafloor immediately adjacent, or slightly displaced from, the surveyed area of seafloor centred on the potential hydrocarbon reservoir.

Figure 8A:
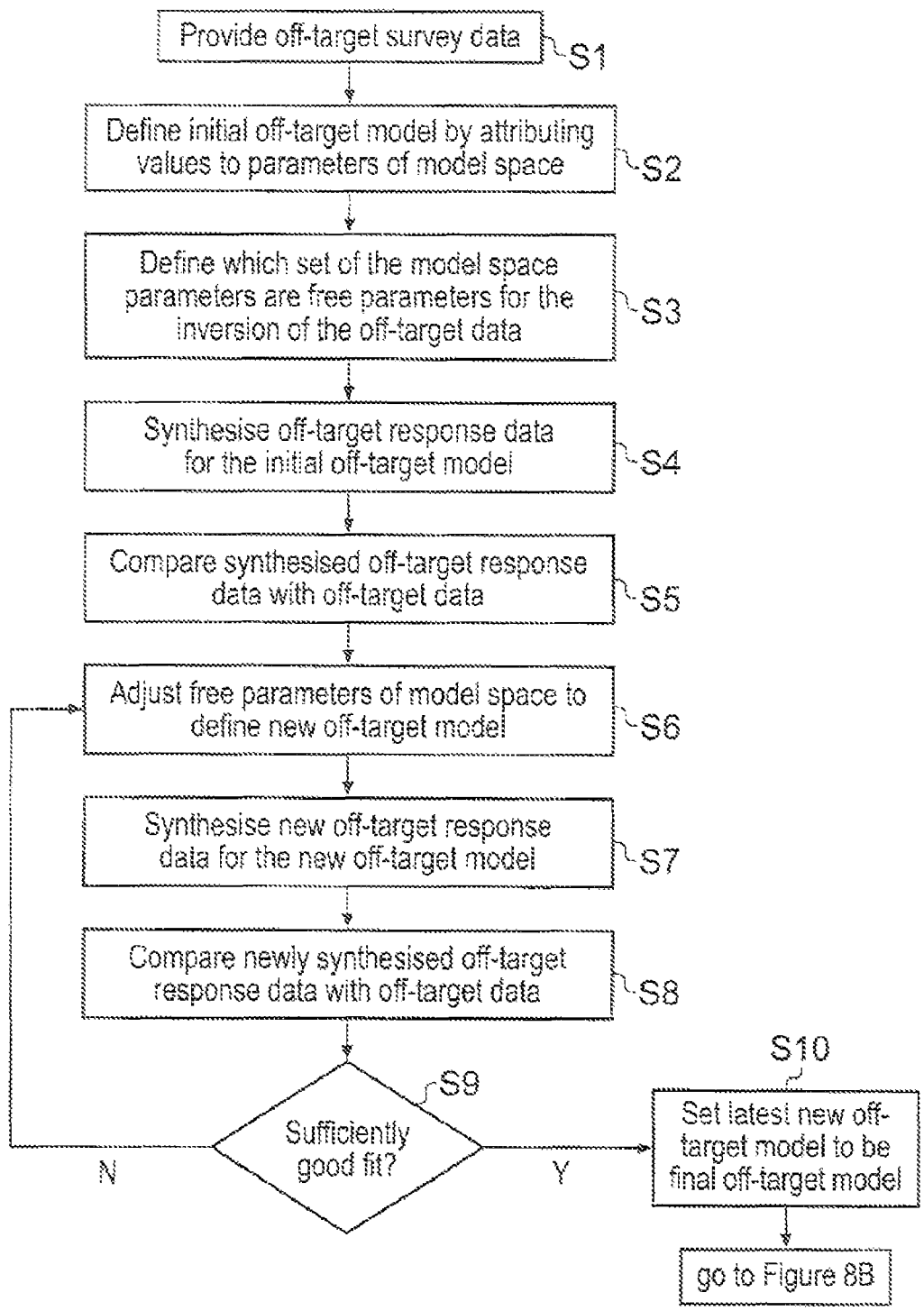
FIGS. 8A and 8B schematically show a flow diagram of a method of analysing results of a CSEM survey of a region of interest containing a previously identified geological structure suitable for bearing hydrocarbons according to an embodiment of the invention.
Figure 8B:
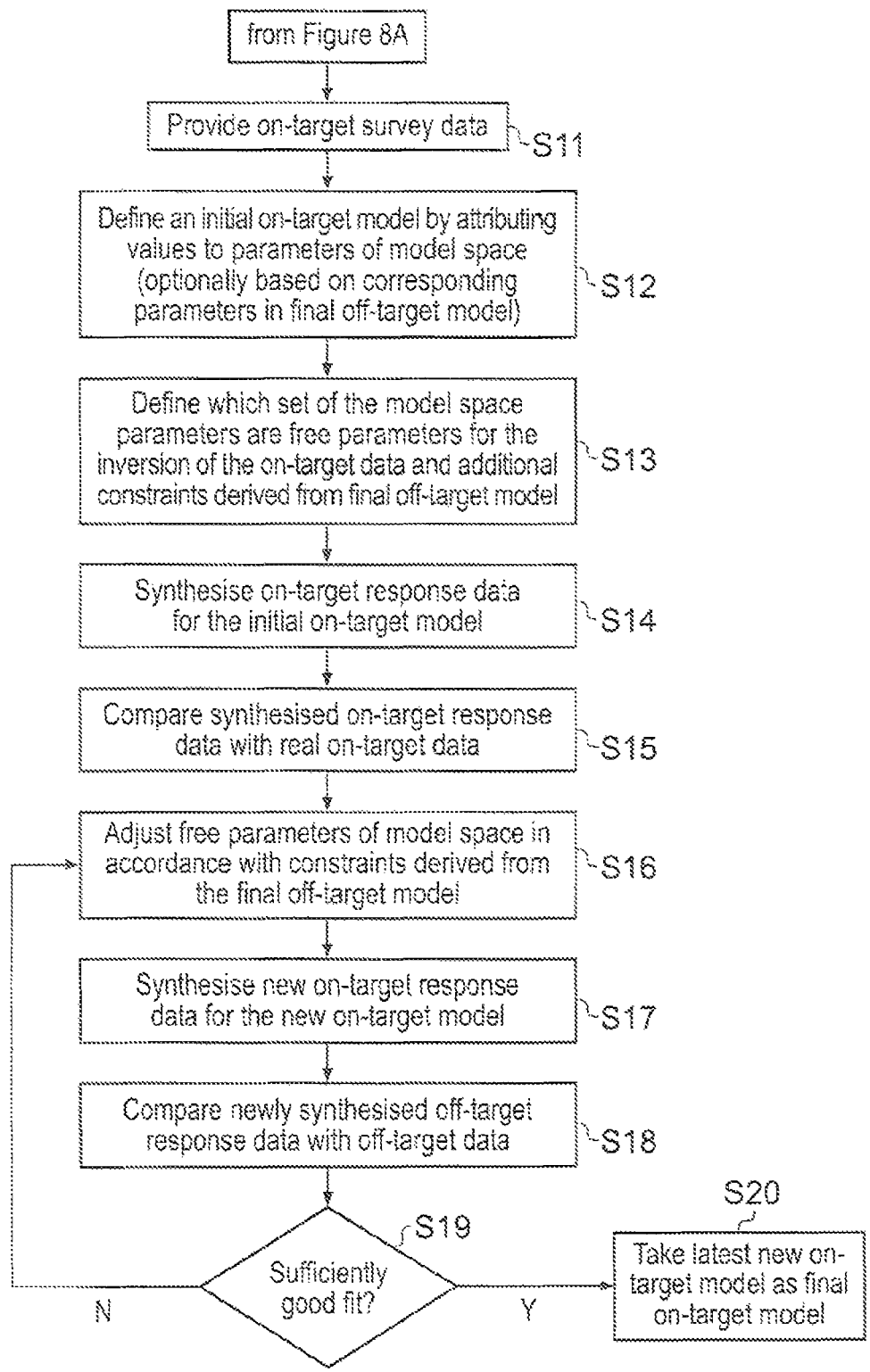

FIGS. 8A and 8B schematically show a flow diagram of a method of analysing results of a CSEM survey of a region of interest containing a previously identified geological structure suitable for bearing hydrocarbons according to an embodiment of the invention.

Steps S1 to S10 correspond to a mathematical inversion of the off-target data set. This inversion is performed to obtain a model of the subterranean strata in the off-target region (i.e., the region outside the region of interest containing the geological structure that may potentially contain hydrocarbon). The inversion of the off-target data set may be based on any conventional CSEM inversion algorithm, for example, as described by Constable et al. [6] or MacGregor [7].

In step S1, off-target survey data of the kind described above are provided.

In step S2, an initial model of the subterranean strata in the off-target region is defined. This is done by notionally dividing the earth into discrete elements and attributing values for the parameters of model space to each of the elements. The elements of the discretised earth may be boxes (for a 3D inversion), horizontal columnar rows (for a 2D inversion), or horizontal layers (for a 1D inversion). For CSEM inversion, the parameters of model space are fundamentally based on the resistivity (or its inverse, conductivity) of the discretised earth elements. This is because it is resistivity which primarily affects the diffusion of EM fields in the subterranean strata. Accordingly, in the following description, the models are defined in terms of the resistivity of each of the earth elements. Furthermore, each element is associated with a value for resistivity in each of three orthogonal directions (i.e. the earth is not assumed to have isotropic conductivity). Thus the parameters of model space are resistivity in a vertical direction ($\rho_z$), and resistivity in two horizontal directions ($\rho_x$ and $\rho_y$). It will be understood that the models could equally be characterised by secondary parameters which are related to resistivity, e.g. rock porosity, fluid properties or fluid interconnection, rather than directly by resistivity itself.

The initial off-target model may take account of any prior knowledge available. For example, results of a previous seismic survey may show the first 300 metres of strata beneath the seafloor to be significantly less dense than the strata beneath that. The lower density strata may be assumed to be more porous, and hence have a higher conductivity. Accordingly, the elements of the discretised earth in the first 300 metres of strata beneath the seafloor in the initial off-target model may be attributed lower resistivity values (in all three directions) than the remainder of strata. Alternatively, the initial off-target model may be defined to be a uniform half-space, i.e. a model in which the parameters of model space take the same value in each earth element.

In step S3, parameters of model space which are free to be adjusted in the model optimisation stage (see step S6) of the inversion are defined. For example, resistivity in each of the three direction (x, y and z) may independently be free parameters. Alternatively, fewer model space parameters may be free to be independently adjusted. For example, it may be assumed that resistivity is the same in the horizontal x- and y-directions, and so only $\rho_z$ and $\rho_x$ are free parameters of model space, with $\rho_y$ forced to take the same value as $\rho_x$.

In step S4, synthetic off-target response data are generated by forward modelling based on the parameters of the initial off-target model. This may be performed using conventional forward modelling algorithms, for example of the kind described by Chave and Cox [8], Unsworth et al. [9], Newman and Alumbaugh [10] and Tompkins [11].

In step S5, the synthetic off-target response data are compared with the real off-target response data obtained in step S1 to ascertain a measure of how closely the synthetic data match the real data. Any conventional manner of parameterising how closely the data are matched may be used to define a "goodness of fit". For example, least-squares difference (or weighted least-squares difference taking account of estimated errors in the real off-target data) techniques may be used to parameterise the goodness of fit.

In step S6, the free parameters of the model space are adjusted to define a new off-target model. The adjustments are made with a view to optimising the goodness of fit between data which will be synthesised using the new off-target model and the real data. These adjustments will generally be required to meet other regularisation constraints. For example it may be required that the model is as smooth (i.e. has the minimum of spatial variations) as possible while still being supported by the data. The adjustments in step S6 may be made in accordance with conventional optimisation techniques used in known CSEM inversion techniques.

In step S7, new synthetic off-target response data are generated by forward modelling based on the parameters of the new off-target model defined in step S6.

In step S8, the new synthetic off-target response data are compared with the real off-target response data obtained in step S1 to ascertain their goodness of fit in the same manner as for step S5.

In step S9, it is decided whether the new off-target response data is a sufficiently good fit to the real off-target data that the inversion can be considered complete. This is done by requiring the goodness of fit determined in step S8 to meet some predefined criterion. For example, if the case that the goodness of fit is parameterised by the root mean square (RMS) deviation between the synthetic and the real data, the RMS deviation may be required to be less than a predefined threshold for the fit to be considered sufficiently good.

In the event that the fit is deemed to be sufficiently good in step S9 (i.e. the required criterion for the goodness of fit is met), the 'Y' branch of the flow diagram is followed to step S10. In step S10, the current new off-target model is deemed to be the final off-target model.

In the event that the fit is deemed not to be sufficiently good in step S9, the 'N' branch of the flow diagram is followed back to step S6. Thus the process iterates through steps S6 to S9 until the synthesised data from the latest new off-target model is a sufficiently good fit to the real off-target data. When this is achieved, the process follows the 'Y' branch from S9 to S10 and the latest new off-target model is deemed to be the final off-target model.

Step S10 represents the end of processing of the off-target data. The result of this processing is a final model of the subterranean strata outside the region of interest.

Steps S11 to S20 correspond to a mathematical inversion of the on-target data set which takes account of the results of the off-target data set. The inversion of the on-target data set may again be based on a conventional inversion algorithm.

In step S11, the on-target survey data are provided.

In step S12, an initial model of the subterranean strata in the region of interest (i.e. in the on-target region) is defined in a manner similar to that described above in connection with step S2. Optionally, the initial on-target model will correspond with the final off-target model obtained in step S10. This approach is likely to reduce the number of iterations required to converge on a suitable final on-target model since the off-target model parameters are likely to represent good starting points for the on-target model parameters, at least in the elements of the discretised earth which do not include the geological structure identified as a potential hydrocarbon reservoir.

In step S13, parameters of model space which are free to be adjusted in the model optimisation stage (step S16) of the on-target data set inversion are defined. This may be done in the same way as described above in connection with step S3. In addition to this, constraints applied to the subsequent processing of the on-target data set, in particular in the model optimisation stage, are defined based on the final off-target image obtained in step S10. These constraints are discussed further below in connection with step S16.

In step S14, synthetic on-target response data are generated by forward modelling based on the parameters of the initial on-target model. This may be done in the same way as in step S4 for the off-target data.

In step S15, the synthetic on-target response data are compared with the real on-target response data obtained in step S11 to ascertain a measure of how closely the synthetic data match the real data and to parameterise the goodness of fit. Again, this may be done in the same way as for the off-target data (see step S5).

In step S16, the free parameters of the model space are adjusted to define a new on-target model. The adjustments are made in accordance with the constraints defined in step S13 with a view to optimising the goodness of fit between data which will be synthesised using the new on-target model and the real data. Examples of suitable additional constraints which may be applied are as follows.

The adjustable model space parameters, e.g., $\rho_x$, $\rho_y$ and $\rho_z$, in the discretised earth elements of the model which are not in the vicinity of the previously identified geological structure may be forced to adopt the same value as in the corresponding discretised elements of the final off-target model. Alternatively, these parameters may be allowed to vary, but only within a limited range based on their values in the final off-target model. In yet another alternative, the parameters may be free to vary, but with a greater penalty cost associated with differences between these parameters in the on-target model and the corresponding parameters in the final off-target model in elements of the model away from the potential hydrocarbon reservoir when determining the goodness of fit. Alternatively, or in addition to, account may be taken of the final off-target model in the processing of the on-target data set by changing the regularisation constraints. For example, the processing may allow regularisation constraints to be broken (or reduced) in areas of the final off-target model where the model space parameters vary most rapidly.

The constraints derived from the final off-target model may be in addition to other regularisation constraints required by the inversion, e.g. that the model is as smooth as possible, or that boundaries between areas are as smooth as possible (sharp boundary inversion), and so on. Having defined the additional constraints, the adjustments to the model space parameters in step S16 can be made in accordance with the usual principles of optimisation techniques used in conventional CSEM inversions.

In step S17, new synthetic on-target response data are generated by forward modelling based on the parameters of the new on-target model defined in step S16.

In step S18, the new synthetic on-target response data are compared with the real on-target response data obtained in step S11 to ascertain their goodness of fit in the same manner as for step S15.

In step S19, it is decided whether the new on-target response data is a sufficiently good fit to the real on-target data that the inversion can be considered complete. This may be done in a manner similar to that described above in connection with the off-target data (see step S9). However, in executing step S19, account may also be taken of the additional constraints which have been derived from the final off-target model. For example, and as described above, a penalty cost may be associated with differences between the new on-target model the final off-target model so that in effect the off-target model is a preferred model and the inversion of the second data set is prejudiced in favour of this preferred model.

In the event that the fit is deemed to be sufficiently good in step S19 according to the defined criteria, the 'Y' branch of the flow diagram is followed to step S20. In step S20, the new on-target model is taken to be the final on-target model.

In the event that the fit is deemed not to be sufficiently good in step S19, the 'N' branch of the flow diagram is followed back to step S16. Thus the process iterates through steps S16 to S19 until the synthesised data from the latest new on-target model is a sufficiently good fit to the real on-target data. When this is achieved, the process follows the 'Y' branch from S19 to S20, and the latest new on-target model is deemed to be the final on-target model.

Thus the result of the processing shown in FIGS. 8A and 8B is a final model of the resistivity of the subterranean strata in each of a series of discretised earth elements comprising the region of interest. This may be interpreted in accordance with known principles for interpreting subterranean resistivity maps. For example, the resistivity map might show that the discretised elements within the previously identified geological structure suitable for bearing hydrocarbons have resistivities similar to those of the surrounding strata. In this case it may be assumed that the geological structure contains only seawater. If, on the other hand, the resistivity map shows that the discretised elements within the geological structure have resistivities significantly higher than those of the surrounding strata, it may be assumed that the geological structure contains hydrocarbon.

Figure 9:
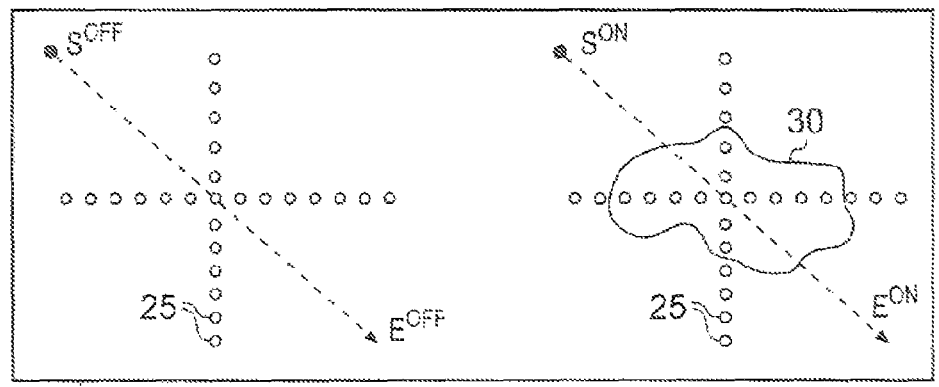
FIGS. 9, 10 and 11 are schematic plan views showing example receiver arrays and source tow lines for providing survey data suitable for analysis according to embodiments of the invention.

FIG. 9 is schematic plan view showing an example array of receivers 25 laid out in the form of two crosses over a section of seafloor 32. The right-hand cross of receivers are for obtaining on-target data, and are arrayed over a region of interest containing a previously identified geological structure 30 suitable for bearing hydrocarbons. The left-hand cross of receivers are for obtaining off-target data, and are arrayed over a region outside of the region of interest. The geological structure 30 has a characteristic size of 10 km. The cross of receivers laid out over the geological structure 30 extends over a similar scale. The cross of receivers outside of the region of interest also extends over the same characteristic scale and is separated from the region of interests by a broadly similar amount. In performing a CSEM survey to provide data for analysis according to embodiments of the invention, on-target data are obtained by towing the HED source along the path identified by the dashed arrow between $S^{on}$ and $E^{on}$ and off-target data are obtained by towing the HED source along the path identified by the dashed arrow between $S^{off}$ and $E^{off}$. The HED source continuously broadcasts as it is towed along the two paths. EM response data are recorded by the receivers arrayed over the region of interest as the source is towed between $S^{on}$ and $E^{on}$ to obtain the on-target data. Similarly. EM response data are obtained by the receivers arrayed outside of the region of interest as the source is towed between $S^{off}$ and $E^{off}$ to obtain the off-target data. Throughout the towing process, the orientation and position of the HED source relative to the receiver network is also logged. It does not matter in which order the data are collected.

Because the tow between $S^{off}$ and $E^{off}$ is away from the potential hydrocarbon reservoir (and so is not affected by it), and provides a comprehensive range of source-receiver offsets throughout the tow, the off-target data collected in this way are well suited to characterising the off-target subterranean strata, and in particular its vertical conductivity anisotropy. The tow between $S^{on}$ and $E^{on}$ provides for broadly similar data coverage (i.e. similar sampling of offsets and orientations), but translated over to the region of interest. The on- and off-target data may then be processed as shown in FIGS. 8A and 8B.

Figure 10:
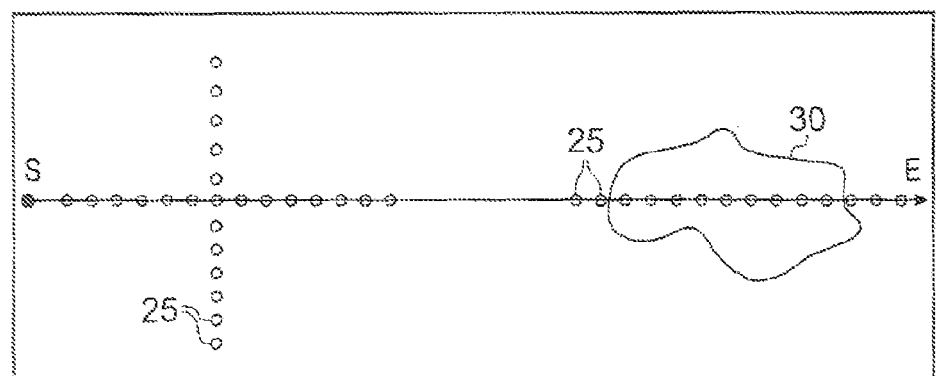
Figure 11:
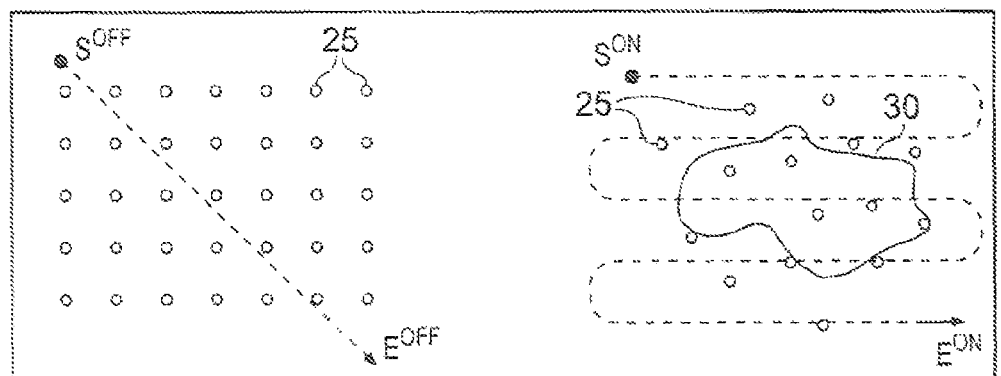

FIGS. 10 and 11 show other examples survey methods for obtaining CSEM data which may be analysed according to embodiments of the invention. These are broadly similar to and will be understood from FIG. 9.

In FIG. 10, the off-target array of receivers (i.e., the receivers 25 arrayed in the form of a cross at the left-hand side of the figure) are arranged in a similar manner to those in FIG. 9. However, the array of receivers 25 over the region of interest are arrayed in a straight line, rather than in the form of a cross. Data are collected as the HED source is towed from S to E along the dotted arrow. During the first half or so of the tow EM response data are recorded by the receivers arrayed outside the region of interest to obtain the off-target data. During the second half-or so of the tow EM data are obtained by the receivers arrayed over the region of interest to obtain the on-target data. As above, the orientation and position of the HED source relative to the receiver network is logged throughout the tow. Again it does not matter in which order the data are collected, and the tow could equally be from E to S.

The tow line in FIG. 10 again provides a comprehensive range of source-receiver offsets for the off-target data. Accordingly, the off-target data collected in this way are again well suited to characterising the off-target subterranean strata. However, the on-target data are only collected for inline orientations. Although conventional surveys require both inline and broadside data to be obtained over the region of interest so that the different responses to the large scale background strata for the different geometries can be relied upon to remove ambiguity [2], this is not necessary for data analysed according to embodiments of the present invention. This is because the background rock formation in which the geological structure of interest is cited is already well characterised by the inversion of the off-target data. Accordingly, inline data (which are the data most sensitive to the presence of hydrocarbon) from the region of interest are sufficient to allow the contents of any potential hydrocarbon reservoir (i.e. whether oil or water) to be determined.

By way of another example, in FIG. 11 the off-target array of receivers are arranged in the form of a regular grid, and the array of receivers 25 over the region of interest are randomly distributed. EM response data are recorded by the receivers arrayed over the region of interest as the source is towed along a winding path from $S^{on}$ and $E^{on}$ to obtain the on-target data, and by the receivers arrayed outside of the region of interest as the source is towed along a path similar to that shown in FIG. 9 between $S^{off}$ and $E^{off}$ to obtain the off-target data.

It will be understood that many other tow patterns and receiver arrays could be used. In general, any arrangement of receivers and tow(s) able to provide off-target data for a range of source-receiver orientations and offsets and on-target data for a range of source-receiver offsets may be used to provide data suitable for analysis according to embodiments of the invention.

It will also be understood that a single source and an array of receivers is not required. For example, suitable data sets could equally be obtained using a single receiver and an array of sources (or a single source towed through a range of appropriate orientations and offsets). However, in general the most efficient way to obtain suitable survey data will be to tow a single source relative to arrays of receivers.

In addition, it is not necessary that the on-target and off-target data are processed in the same way. For example, although FIGS. 8A and 8B show both data sets being processed by mathematical inversion techniques, other approaches could be used. For example, the off-target data may be processed using a mathematical inversion technique in line with steps S1 to S10 in FIG. 8A, but the on-target data set may then be processed using wave-field extrapolation (imaging) techniques [5] configured to take account of the results of the inversion of the off-target data set (i.e. the equivalent of the final off-target model of step S10 of FIG. 8A). For example, the final off-target model subterranean strata may be used as the starting model for the wave-field extrapolation. Furthermore, this could be iterated with a subsequent processing of the on-target data set taking account of the results of a previous processing of the on-target set.

Although the above discussion has concentrated on electric field components of the electromagnetic field response, it will be understood that similar analysis schemes based on the magnetic field components of the electromagnetic field response could also be employed.

Finally, it will be understood that the invention is equally applicable to surveying of freshwater, for example large lakes or estuaries, so that references to seafloor, seawater etc. should not be regarded as limiting and should be interpreted as covering lakebed, riverbed etc.

Thus a method of analysing results from a controlled source electromagnetic survey of a region of interest containing a previously identified geological structure suitable for bearing hydrocarbons is described. The method comprises providing a first survey data set obtained outside the region of interest, i.e. off-target, for a range of source-receiver orientations and offsets, and providing a second survey data set obtained inside the region of interest, i.e. on target, for a range of source-receiver offsets. The method further comprises performing a mathematical inversion of the first survey data set to provide a model of the subterranean strata outside the region of interest, and processing the second survey data set to provide a model of the subterranean strata inside the region of interest, wherein the processing of the second survey data set takes account of the results of the inversion of the first survey data set.

Figure 12:
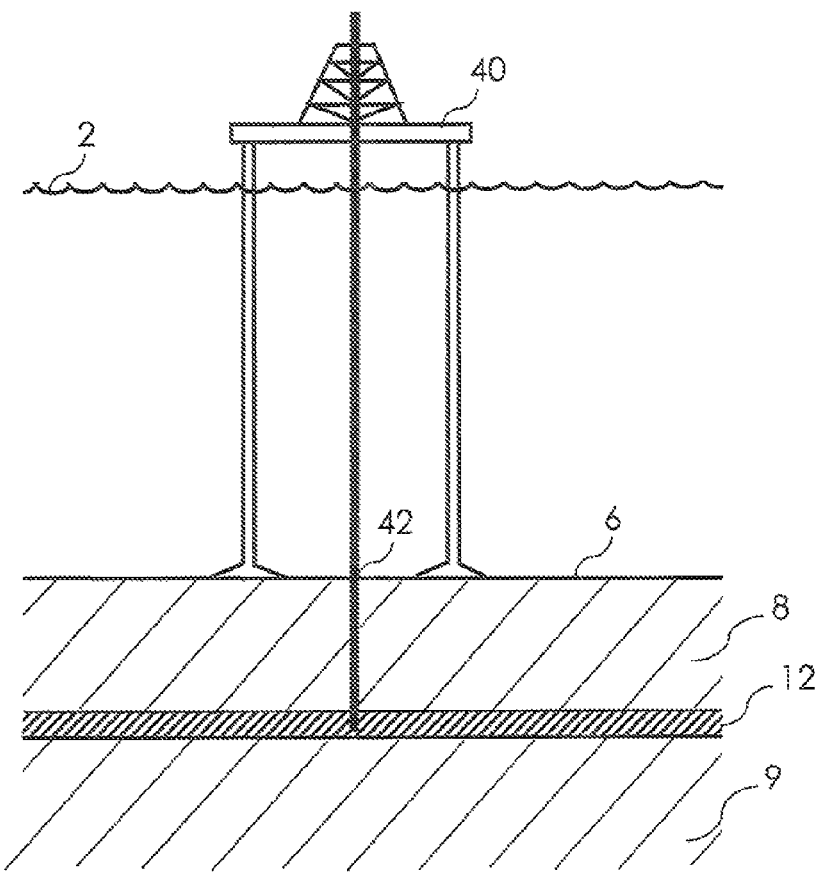
FIG. 12 is a schematic view of an oil rig producing hydrocarbon according to an embodiment of the invention.

FIG. 12 is a schematic view of an oil rig 40 producing hydrocarbon according to an embodiment of the invention. The oil rig is located in the vicinity of a region of interest which has been surveyed, and the resulting data sets analysed, according to the above described methods. It is assumed here that the results of the analysis have identified a subterranean hydrocarbon reservoir 12 within the region of interest. The identified hydrocarbon reservoir has been penetrated by a hydrocarbon-producing well 42 carried by the oil rig 40. Hydrocarbon (e.g. oil) may be produced from the well 42 (i.e. extracted/recovered from the reservoir 12) using conventional techniques.

Figure 13:
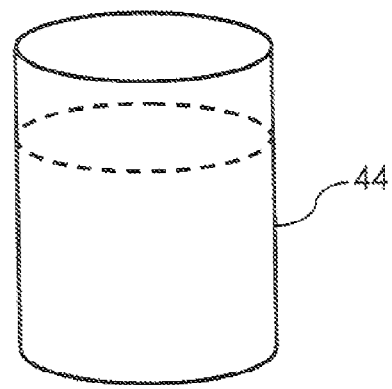
FIG. 13 is a schematic perspective view of a barrel containing a volume of hydrocarbon according to an embodiment of the invention.

FIG. 13 is a schematic perspective view of a barrel containing a volume of hydrocarbon 44 according to an embodiment of the invention. The hydrocarbon is produced using the well 42 shown in FIG. 12.

Figure 14:
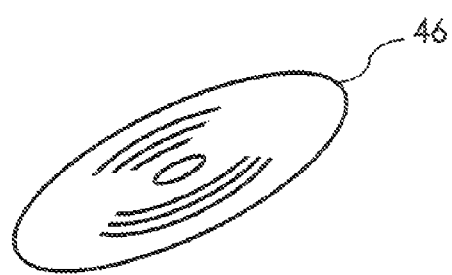
FIG. 14 is a schematic perspective view of a data storage medium bearing a data set according to an embodiment of the invention.

FIG. 14 is a schematic perspective view of a data storage medium 46 bearing a data set according to an embodiment of the invention. The data storage medium in this example is a conventional optical disc, e.g. a data compact disc or data DVD disc. Any other storage medium may equally be used. Thus data sets obtained according to embodiments of the invention, e.g. the above described on-target and/or off-target survey data sets, may be stored on the data storage medium 46 for later analysis.

CONCLUSION

Example embodiments of the present invention have been described above. Those skilled in the art will understand, however, that changes and modifications may be made to the embodiments described without departing from the true scope and spirit of the invention, which is defined by the claims.

REFERENCES

[1] Johansen, S. E., Amundsen, H. E. F., Rosten, T., Ellingsrud, S., Eidesmo. T., Bhuyian, A. H., *Subsurface hydrocarbons detected by electromagnetic sounding*, First Break, vol. 23, pp. 31-36, March 2005.

[2] GB 2 382 875 (University of Southampton).

[3] Tompkins, M. J., Weaver, R., MacGregor L. M., *Effects of Vertical Anisotropy on Marine Active Source Electromagnetic Data and Inversions*, EAGE 66th Conference & Exhibition, Paris, 7-10 Jun. 2004.

[4] Behrens, J. P., *The Detection of Electrical Anisotropy in 35 Ma Pacific Lithosphere: Results from a Marine Controlled-Source Electromagnetic Survey and Implications for Hydration of the Upper Mantle*, Dissertation for the degree of Doctor of Philosophy in Earth Sciences, University of California, San Diego, 2005.

[5] GB 2 413 851 (OHM Limited).

[6] Constable S. C., Parker R. L., Constable, C. G., Occam's inversion: *A practical algorithms for generating smooth models from EM sounding data*, Geophysics, vol. 52, pp. 289-300, 1987.

[7] MacGregor, L. M., *Marine CSEM Sounding: Development of a regularised inversion for 2D resistivity structures*, LITHOS Science Report, 1, 103-109, April 1999.

[8] Chave, A. D., Cox, C. S., *Controlled electromagnetic sources for measuring electrical conductivity beneath the oceans 1. Forward problem and model study*, J. Geophysical Research, vol. 87, no. B7, pp. 5327-5338, July 1982.

[9] Unsworth, J. M., Travis, B. J., Chave, A. D., *Electromagnetic induction by a finite electric dipole source over a 2-D earth*, Geophysics, vol. 58 no. 2, pp. 198-214, February 1993.

[10] Newman, G. A., Alumbaugh, D. L., *Three-Dimensional Massively Parallel Electromagnetic Inversion-I. Theory*, Report SAND96-0582, Sandia Nat'l Labs, 1996 and Geophys. J. Int., v. 128, pp. 345-354, 1997.

[11] Tompkins, M., *Analysis of multi-component borehole electromagnetic induction responses using anisotropic forward modelling and inversion*, Dissertation for the degree of Doctor of Philosophy, University of Wisconsin-Madison, 2003.

What is claimed:

1. A computer-implemented method of analysing results from a controlled source electromagnetic survey of a region of interest, the region of interest containing a previously identified geological structure suitable for bearing hydrocarbons, the method comprising:

providing a first controlled source electromagnetic survey data set obtained outside and away from the region of interest for a range of source-receiver orientations and offsets;

providing a second controlled source electromagnetic survey data set obtained inside the region of interest for a range of source-receiver offsets;

performing in a processor of a computer a mathematical inversion of the first controlled source electromagnetic survey data set to provide a model of the subterranean strata outside and away from the region of interest; and processing the second controlled source electromagnetic survey data set to provide a model of the subterranean strata inside the region of interest, wherein the processing takes account of the model of the subterranean strata outside and away from the region of interest.

2. A method according to claim 1, wherein the first controlled source electromagnetic survey data set comprises data obtained using a horizontal electric dipole source for a range of offsets broadside to the axis of the source and data for a range of offsets inline with the axis of the source.

3. A method according to claim 2, wherein the data of the first controlled source electromagnetic survey data set for offsets inline with the axis of the source are horizontal field data.

4. A method according to claim 2, wherein the data of the first controlled source electromagnetic survey data set for offsets inline with the axis of the source are vertical field data.

5. A method according to claim 1, wherein the first controlled source electromagnetic survey data set comprises data obtained using a horizontal electric dipole source for a range of offsets for orientations intermediate between broadside to the axis of the source and inline with the axis of the source.

6. A method according to claim 1, wherein the first controlled source electromagnetic survey data set comprises data obtained using a vertical electric dipole source for a range of offsets.

7. A method according to claim 1, wherein the second controlled source electromagnetic survey data set comprises data obtained using a horizontal electric dipole source for a range of offsets inline with the axis of the source.

8. A method according to claim 7, wherein the second controlled source electromagnetic survey data set further comprises data for a range of offsets broadside to the dipole axis of the source.

9. A method according to claim 7, wherein the data of the second controlled source electromagnetic survey data set for offsets inline with the axis of the source are horizontal field data.

10. A method according to claim 7, wherein the data of the second controlled source electromagnetic survey data set for offsets inline with the axis of the source are vertical field data.

11. A method according to claim 1, wherein the second controlled source electromagnetic survey data set comprise data obtained using a horizontal electric dipole source data for a range of offsets for orientations intermediate between broadside to the axis of the source and inline with the axis of the source.

12. A method according to claim 1, wherein the second controlled source electromagnetic survey data set comprises data obtained using a vertical electric dipole source for a range of offsets.

13. A method according to claim 1, wherein the step of performing a mathematical inversion of the first controlled source electromagnetic survey data set further comprises allowing conductivity in the model of the subterranean strata outside and away from the region of interest to be independently determined in two directions.

14. A method according to claim 13, wherein the two directions comprise a vertical direction and a horizontal direction.

15. A method according to claim 1, wherein the step of processing the second controlled source electromagnetic survey data set comprises performing a mathematical inversion in which at least one parameter of model space is constrained according to its value in the model of the subterranean strata outside and away from the region of interest.

16. A method according to claim 15, wherein the parameter is constrained by being ascribed a fixed value corresponding to its value in the model of the subterranean strata outside and away from the region of interest.

17. A method according to claim 15, wherein the parameter is constrained by being required to adopt a value within a range of values based on its value in the model of the subterranean strata outside and away from the region of interest.

18. A method according to claim 15, wherein the parameter is constrained by being ascribed a preferred value based on its value in the Model of the subterranean strata outside and away from the region of interest, and the mathematical inversion of the second controlled source electromagnetic survey data set is prejudiced in favour of models in which the parameter is closest to the preferred value.

19. A method according to claim 1, wherein the step of processing the second controlled source electromagnetic survey data set comprises performing a wave-field extrapolation in which an initial model for the wave-field extrapolation corresponds to the model of the subterranean strata outside and away from the region of interest.

20. A method according to claim 1, further comprising reprocessing the second controlled source electromagnetic survey data set to provide a revised model of the subterranean strata inside the region of interest, wherein the reprocessing takes account of the model of the subterranean strata inside the region of interest.

21. A method according to claim 20, further comprising iteratively performing the reprocessing, wherein a current iteration takes account of the revised model provided by a previous iteration.

22. A non-transitory computer program product bearing machine readable instructions for implementing a method of analysing results from a controlled source electromagnetic survey according to claim 1.

23. A computer apparatus loaded with machine readable instructions for processing the method of analysing results from a controlled source electromagnetic survey according to claim 1.

24. A computer-implemented method of planning a controlled source electromagnetic survey of a region of interest, the region of interest containing a previously identified geological structure suitable for bearing hydrocarbons, the method comprising:
   creating a model of a region outside and away from the region of interest, including a rock formation and a body of water above it;
   creating a model of the region of interest which corresponds to the model outside of and away from the region of interest, but further including a hydrocarbon reservoir;
   performing a simulation of an electromagnetic survey outside and away from the region of interest to provide a first simulated controlled source electromagnetic survey data set for a range of source-receiver orientations and offsets;
   performing a simulation of an electromagnetic survey inside the region of interest to provide a second simulated controlled source electromagnetic survey data set for a range of source-receiver offsets;
   performing in a processor of a computer a mathematical inversion of the first simulated controlled source electromagnetic survey data set to provide a simulated recovered model of the subterranean strata outside and displaced away from the region of interest; and
   processing the second simulated controlled source electromagnetic survey data set to provide a simulated recovered model of the subterranean strata inside the region of interest, wherein processing the second simulated controlled source electromagnetic survey data set takes account of the simulated recovered model of the subterranean strata outside and away from the region of interest.

25. A method according to claim 24, further comprising:
repeating the simulation of an electromagnetic survey outside and away from the region of interest for a number of source frequencies in order to select optimum survey conditions in terms of source frequency and source-receiver orientations and distances for characterising the rock formation.

26. A method according to claim 24, further comprising:
repeating the simulation of an electromagnetic survey inside the region of interest for a number of source frequencies in order to select optimum survey conditions in terms of source frequency and source-receiver distances for probing the hydrocarbon reservoir.

27. A non-transitory computer program product bearing machine readable instructions for implementing a method of planning a controlled source electromagnetic survey according to claim 24.

28. A computer apparatus loaded with machine readable instructions for processing the method of planning a controlled source electromagnetic survey according to claim 24.

* * * * *